(12) United States Patent
Hao et al.

(10) Patent No.: US 12,629,662 B2
(45) Date of Patent: May 19, 2026

(54) SELECTIVE AMMONIA OXIDATION CATALYST

(71) Applicant: BASF Corporation, Florham Park, NJ (US)

(72) Inventors: Yu Fen Hao, Shanghai (CN); Yuejin Li, Iselin, NJ (US); Stanley A. Roth, Yardley, PA (US); Jan Martin Becker, Hannover (DE); Stefan Maurer, Ludwigshafen (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 852 days.

(21) Appl. No.: 17/594,311

(22) PCT Filed: Apr. 8, 2020

(86) PCT No.: PCT/US2020/027180
§ 371 (c)(1),
(2) Date: Oct. 11, 2021

(87) PCT Pub. No.: WO2020/210295
PCT Pub. Date: Oct. 15, 2020

(65) Prior Publication Data
US 2022/0143579 A1 May 12, 2022

(30) Foreign Application Priority Data

Apr. 11, 2019 (WO) ................ PCT/CN2019/082306

(51) Int. Cl.
B01J 23/42 (2006.01)
B01J 21/06 (2006.01)
(Continued)

(52) U.S. Cl.
CPC ............. B01J 23/42 (2013.01); B01J 21/063 (2013.01); B01J 29/7015 (2013.01); B01J 35/40 (2024.01);
(Continued)

(58) Field of Classification Search
CPC ........ B01J 21/063; B01J 23/42; B01J 23/462; B01J 35/613; B01J 35/633; B01J 29/7015;
(Continued)

(56) References Cited

U.S. PATENT DOCUMENTS

| | | | |
|---|---|---|---|
| 6,207,610 B1 * | 3/2001 | Krause | ................... B01J 35/615 502/262 |
| 6,432,869 B1 * | 8/2002 | Krause | ................... C04B 35/16 502/238 |

(Continued)

FOREIGN PATENT DOCUMENTS

| | | |
|---|---|---|
| WO | WO-2010/062730 A2 | 6/2010 |
| WO | WO-2011/140251 A2 | 11/2011 |
| WO | WO-2017/037006 A1 | 3/2017 |

OTHER PUBLICATIONS

International Search Report dated Jul. 15, 2020, PCT/US2020/027180.

*Primary Examiner* — Cam N. Nguyen
(74) *Attorney, Agent, or Firm* — DLA Piper LLP (US)

(57) ABSTRACT

The invention relates to a selective ammonia oxidation catalysts comprising a platinum group metal and a support comprising $TiO_2$ doped with 0-10% by weight of $SiO_2$, $WO_3$, $ZrO_2$, $Y_2O_3$, $La_2O_3$, or a mixture thereof. The invention further comprises methods for the manufacture of the selective ammonia oxidation catalysts, and integrated catalyst systems comprising the selective ammonia oxidation catalysts for treating an exhaust gas stream.

14 Claims, 8 Drawing Sheets

Selective Ammonia Oxidation Catalyst

(51) Int. Cl.

| | |
|---|---|
| *B01J 29/70* | (2006.01) |
| *B01J 35/40* | (2024.01) |
| *B01J 35/45* | (2024.01) |
| *B01J 35/56* | (2024.01) |
| *B01J 35/61* | (2024.01) |
| *B01J 35/63* | (2024.01) |
| *B01J 35/77* | (2024.01) |
| *B01J 37/10* | (2006.01) |
| *F01N 3/20* | (2006.01) |

(52) U.S. Cl.
CPC .............. *B01J 35/45* (2024.01); *B01J 35/56* (2024.01); *B01J 35/613* (2024.01); *B01J 35/633* (2024.01); *B01J 35/77* (2024.01); *F01N 3/2066* (2013.01); *F01N 2570/14* (2013.01)

(58) Field of Classification Search
CPC ... B01J 35/40; B01J 35/45; B01J 35/56; B01J 35/77; B01J 35/612; B01J 35/615; B01J 35/647; B01J 35/19; B01J 21/066; B01J 29/763; B01J 37/0201; B01J 37/0244; B01J 37/0248; B01J 37/10; F01N 3/2066; F01N 2570/14; B01D 2255/9205; B01D 2255/9207; B01D 53/9468; B01D 2255/1021; B01D 2255/20707; B01D 2258/012; B01D 53/9436; B01D 53/9477; Y02C 20/10
USPC ........................................................ 502/339
See application file for complete search history.

(56) References Cited

U.S. PATENT DOCUMENTS

| | | | | |
|---|---|---|---|---|
| 6,989,345 | B2 * | 1/2006 | Lansink Rotgerink .. | B01J 27/16 502/239 |
| 7,148,179 | B2 * | 12/2006 | Lansink Rotgerink ..................... | B01J 37/0018 502/239 |
| 7,393,511 | B2 | 7/2008 | Tran et al. | |
| 8,865,615 | B2 * | 10/2014 | Ito ............................ | B01J 23/42 502/313 |
| 8,940,259 | B2 * | 1/2015 | Brown .................... | F01N 3/106 60/299 |
| 9,227,176 | B2 * | 1/2016 | Andersen ............. | B01J 37/0244 |
| 9,943,830 | B2 * | 4/2018 | Micallef ............ | B01D 53/9436 |
| 10,022,703 | B2 * | 7/2018 | Kristensen ............... | B01J 35/39 |
| 10,137,413 | B2 * | 11/2018 | Cole .................. | B01D 53/9459 |
| 10,179,325 | B2 * | 1/2019 | Chiffey .................... | B01J 35/19 |
| 10,240,500 | B2 * | 3/2019 | Chiffey ............. | B01D 53/9418 |
| 10,443,478 | B2 * | 10/2019 | Johansen .............. | F01N 3/2066 |
| 10,570,802 | B2 * | 2/2020 | Johansen ........... | B01D 53/9436 |
| 10,577,999 | B2 * | 3/2020 | Johansen ............... | B01J 23/42 |
| 10,722,876 | B2 * | 7/2020 | Liu .......................... | B01J 35/40 |
| 11,103,855 | B2 * | 8/2021 | Chiffey ............. | B01D 53/9418 |
| 11,117,098 | B2 * | 9/2021 | Li ......................... | B01D 53/944 |
| 11,154,847 | B2 * | 10/2021 | Patchett .................. | B01J 23/44 |
| 2008/0292519 | A1 | 11/2008 | Caudle et al. | |
| 2010/0080737 | A1 | 4/2010 | Nochi et al. | |
| 2011/0286900 | A1 | 11/2011 | Caudle et al. | |
| 2014/0212350 | A1 * | 7/2014 | Andersen .......... | B01D 53/9477 502/309 |
| 2015/0031526 | A1 | 1/2015 | Micallef et al. | |
| 2018/0078900 | A1 * | 3/2018 | Andersen .......... | B01D 53/9418 |

\* cited by examiner

Selective Ammonia Oxidation Catalyst

SELECTIVE AMMONIA OXIDATION CATALYST

CROSS-REFERENCE TO RELATED APPLICATIONS

This application is a national stage filing under 35 U.S.C. § 371 of International Application No. PCT/US2020/027180, filed on Apr. 8, 2020, which claims the benefit of priority to International Application No. PCT/CN2019/082306, filed Apr. 11, 2019; the disclosure of these applications are each incorporated herein by reference in their entirety.

TECHNICAL FIELD

The invention pertains to selective ammonia oxidation (AMO$_x$) catalysts, methods for their manufacture, and integrated catalyst systems for treating an exhaust gas stream.

BACKGROUND OF ART

Diesel engine exhaust is a heterogeneous mixture that contains particulate emissions such as soot and gaseous emissions including carbon monoxide, unburned or partially burned hydrocarbons, and nitrogen oxides (collectively referred to as NO$_x$). Catalyst compositions, often disposed on one or more monolithic substrates, are placed in engine exhaust systems to convert certain or all of these exhaust components to innocuous compounds.

Selective catalytic reduction (SCR) is a NO$_x$ abatement technology that will be used to meet strict NO$_x$ emission targets in diesel and lean-burn engines. In the ammonia SCR process, NO$_x$ (normally consisting of NO+NO$_2$) reacts with ammonia (or an ammonia precursor such as urea) to form dinitrogen (N$_2$) over a catalyst typically composed of base metals. This technology is capable of obtaining NO$_x$ conversions greater than 90% over a typical diesel driving cycle, and thus it represents one of the best approaches for achieving aggressive NO$_x$ abatement goals.

A characteristic feature of some SCR catalyst materials is a propensity to retain considerable amounts of ammonia on Lewis and Brnsted acidic sites on the catalyst surface during low temperature portions of a typical driving cycle. A subsequent increase in exhaust temperature can cause ammonia to desorb from the ammonia SCR catalyst surface and exit the exhaust pipe of the vehicle. Overdosing ammonia in order to increase NO$_x$ conversion rate is another potential scenario where ammonia may exit from the ammonia SCR catalyst.

Ammonia slip from the SCR catalyst presents a number of problems. The odor threshold for NH$_3$ is 20 ppm in air. Eye and throat irritation are noticeable above 100 ppm, skin irritation occurs above 400 ppm, and the Immediate Danger to Life & Health (IDLH) is 500 ppm in air. NH$_3$ is caustic, especially in its aqueous form. Condensation of NH$_3$ and water in cooler regions of the exhaust line downstream of the exhaust catalysts will give a corrosive mixture.

Therefore, it is desirable to eliminate the ammonia before it can pass into the tailpipe. A selective ammonia oxidation (AMO$_x$) catalyst is employed for this purpose, with the objective to convert the excess ammonia to N$_2$. It would be desirable that the AMO$_x$ catalyst should also produce minimal N$_2$O, which is a potent greenhouse gas. Ideally, an AMO$_x$ catalyst should exhibit both high NH$_3$ oxidation activity and high selectivity to N$_2$. However, most of the known AMO$_x$ catalysts display a trade-off relationship for activity and selectivity, i.e., higher NH$_3$ oxidation activity is accompanied by a lower N$_2$ selectivity (higher level of byproduct formation, such as N$_2$O and NO$_x$).

Generally, the AMO$_x$ catalyst comprises noble metals supported on a refractory metal oxide support such as alumina, silica, zirconia or combinations thereof. Although many refractory metal oxide supports are disclosed to be used in the AMO$_x$ catalyst, as described in the patent documents WO2010/062730A1, WO2011/140251A1, WO 2017/037006A1, and U.S. 2011/0286900A1, there is no report in the art that pure titania is used as a support in the AMO$_x$ catalyst, likely because pure titania is considered to have poor hydrothermal stability. It is well known that the specific surface area of titania reduces significantly after aging at high temperature, especially higher than 560° C. Therefore, pure titania is generally not considered a suitable carrier for supported catalysts which need to withstand severe hydrothermal aging conditions.

However, the inventors of the invention disclosed in this application found that an AMO$_x$ catalyst which contains a platinum group metal (PGM), especially Pt supported on a support consisting of TiO$_2$ exhibits both high NH$_3$ oxidation activity and high N$_2$ formation selectivity, especially less N$_2$O formation.

INVENTION SUMMARY

The present invention provides a selective ammonia oxidation (AMO$_x$) catalyst, comprising a platinum group metal (PGM) and a support consisting of TiO$_2$, wherein the TiO$_2$ is doped with 0-10% wt of SiO$_2$, WO$_3$, ZrO$_2$, Y$_2$O$_3$, La$_2$O$_3$, or a mixture thereof.

The present invention also provides an integrated SCR/AMOx catalyst system for treating an exhaust gas stream, comprising:

- the selective ammonia oxidation (AMOx) catalyst above, and
- a selective catalytic reduction (SCR) catalyst to promote reaction of ammonia with nitrogen oxides to form nitrogen and H$_2$O selectively.

The present invention also provides an exhaust treatment system comprising:

- a diesel oxidation catalyst (DOC), a catalyzed soot filter (CSF), a reductant injector, and the integrated SCR/AMOx catalyst system above;
- optionally, the exhaust treatment system further comprises a second selective catalyzed reduction (SCR) catalyst and/or a lean NOx trap (LNT).

The present AMO$_x$ catalysts show both high NH$_3$ activity such as lower NH$_3$ light-off temperature T$_{70}$ and high N$_2$ selectivity such as less nitrous oxide (N$_2$O) byproduct formation, compared to AMO$_x$ catalysts containing a platinum group metal (PGM) and a routine refractory metal oxide support other than pure TiO$_2$ or TiO$_2$ doped with small amount (<10%) of SiO$_2$, WO$_3$, ZrO$_2$, Y$_2$O$_3$, La$_2$O$_3$, or a mixture thereof.

EMBODIMENTS

Figure 1:
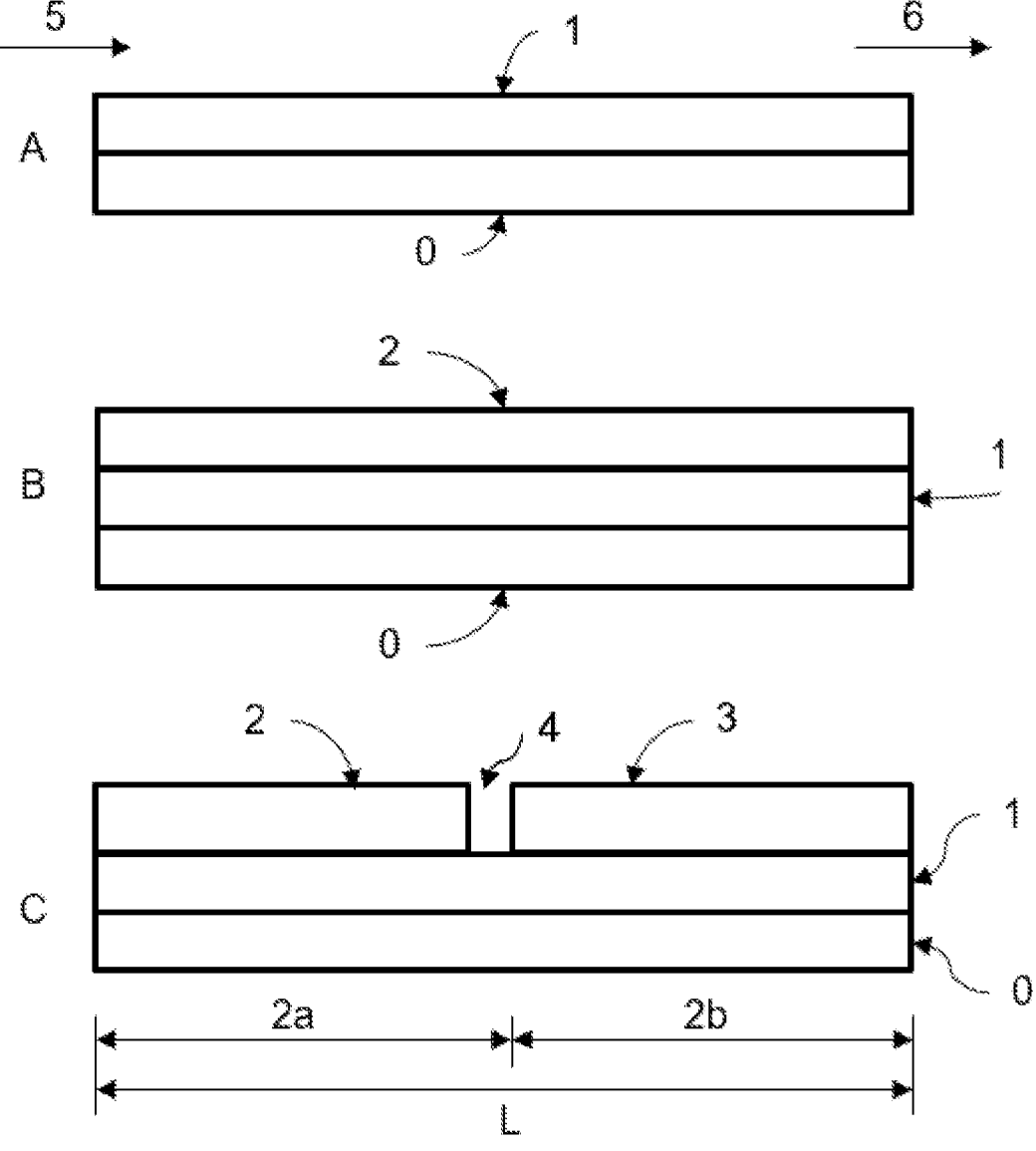
FIG. 1A shows a layout of AMOx catalyst according to one or more embodiments.
FIG. 1B shows a layout of integrated catalyst system according to one or more embodiments.
FIG. 1C shows a layout of integrated catalyst system according to one or more embodiments.

As used in this specification and the appended claims, the singular forms "a," "an," and "the" include plural referents unless the context clearly indicates otherwise.

The term "$NH_3$ oxidation" refers to a process in which ammonia ($NH_3$) is reacted with oxygen ($O_2$) to produce $N_2$, NO, $NO_2$, $N_2O$, preferably $N_2$.

AMOx Catalyst

In one or more embodiments, the selective ammonia oxidation ($AMO_x$) catalyst comprises a platinum group metal (PGM) and a support consisting of $TiO_2$. Herein, said support essentially consists of $TiO_2$, wherein the $TiO_2$ is doped with 0-10% wt of $SiO_2$, $WO_3$, $ZrO_2$, $Y_2O_3$, $La_2O_3$, or a mixture thereof, wherein 10% wt is excluded.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), and ruthenium (Ru), and mixtures thereof.

In specific embodiments, the platinum group metal includes physical mixtures or chemical or atomically-doped combinations of platinum group metals.

In specific embodiments, the AMOx catalyst disclosed herein comprises total PGM loading from about 0.3 g/ft³ to about 20 g/ft³ (about 0.01-0.70 g/L), preferably about 0.5 g/ft³ to about 10 g/ft³ (about 0.02-0.35 g/L), more preferably about 0.8 g/ft³ to about 3 g/ft³ (about 0.03-0.10 g/L), calculated as the total weight of PGM element over the volume of the monolith substrate.

In specific embodiments, the platinum group metal comprises platinum (Pt). The ammonia oxidation catalyst comprises the platinum (Pt) component in an amount in the range of about 0.3 g/ft³ to about 20 g/ft³ (about 0.01-0.70 g/L), preferably about 0.5 g/ft³ to about 10 g/ft³ (about 0.02-0.35 g/L), more preferably about 0.8 g/ft³ to about 3 g/ft³ (about 0.03-0.10 g/L), calculated as the total weight of platinum (Pt) component over the volume of the monolith substrate. In more specific embodiments, the platinum group metal is Pt, and there are no other platinum group metals present.

As used herein, the terms "no other platinum group metals" means that no platinum group metal other than platinum have been intentionally added to the catalyst, and that there is generally less than about 1 wt. %, including less than about 0.75 wt. %, less than about 0.5 wt. %, less than about 0.25 wt. %, and less than about 0.1 wt. %, of other platinum group metals in the catalyst. In other words, the catalyst does not comprise palladium (Pd), ruthenium (Ru), osmium (Os), or iridium (Ir). In one or more embodiments, the catalyst comprises platinum and no other platinum group metal. In such embodiments, the catalyst does not contain palladium (Pd), ruthenium (Ru), osmium (Os), iridium (Ir), or rhodium (Rh).

In specific embodiments, the platinum group metal comprises palladium (Pd). The AMOx catalyst comprises the palladium (Pd) component in an amount in the range of about 0.3 g/ft³ to about 20 g/ft³, preferably about 0.5 g/ft³ to about 10 g/ft³, more preferably about 0.8 g/ft³ to about 3 g/ft³, calculated as the total weight of palladium (Pd) component over the volume of the substrate.

In specific embodiments, the platinum group metal comprises rhodium (Rh). The AMOx catalyst comprises the rhodium (Rh) component in an amount in the range of about 0.3 g/ft³ to about 20 g/ft³, preferably about 0.5 g/ft³ to about 10 g/ft³, more preferably about 0.8 g/ft³ to about 3 g/ft³, calculated as the total weight of rhodium (Rh) component over the volume of the substrate.

In one or more specific embodiments, the $TiO_2$ has a BET specific surface area of 5-120 m²/g, specifically 7-50 m²/g, more specifically 9-25 m²/g, after 10% vol $H_2O$ hydrothermal aging at 750° C. for 20 hours. Before aging, the fresh $TiO_2$ has a BET specific surface area of 40-400 m²/g, specifically 50-200 m²/g, more specifically 75-100 m²/g.

As used herein, the term "BET surface area" has its usual meaning of referring to the Brunauer, Emmett, Teller method for determining surface area by $N_2$ adsorption.

In one or more specific embodiments, the $TiO_2$ has a mean pore volume (BET) in the range of 0.01 to 0.2 cm³/g, after aging at 750° C. for 20 hours; or mean pore diameter (BET) in the range of 5 to 50 nm, after aging at 750° C. for 20 hours. Before aging, the fresh $TiO_2$ has a mean pore volume (BET) in the range of 5 to 30 cm³/g, or mean pore diameter (BET) in the range of 2.5 to 20 nm.

In one or more embodiments, the $TiO_2$ has an average particle size in the range of 250-450 nm, preferably 300-400 nm, after aging at 750° C. for 20 hours. Before aging, the fresh $TiO_2$ has an average particle size in the range of 20-120 nm, preferably 45-95 nm.

In one or more embodiments, the AMOx catalyst has a surface area (BET) in the range of about 5 to about 120 m²/g, preferably 7-50 m²/g, more preferably 9-25 m²/g, after 10% vol $H_2O$ hydrothermal aging at 750° C. for 20 hours. Before aging, the fresh AMOx catalyst has a BET specific surface area of 40-400 m²/g, specifically 50-200 m²/g, more specifically 75-100 m²/g.

In one or more specific embodiments, the AMOx catalyst has a mean pore volume (BET) in the range of 0.01 to 0.2 cm³/g, after aging at 750° C. for 20 hours; or mean pore diameter (BET) in the range of 5 to 50 nm, after aging at 750° C. for 20 hours. Before aging, the fresh AMOx catalyst has a mean pore volume (BET) in the range of 5 to 30 cm³/g, or mean pore diameter (BET) in the range of 2.5 to 20 nm.

In one or more embodiments, the AMOx catalyst has an average particle size in the range of 250-450 nm, preferably 300-400 nm, after aging at 750° C. for 20 hours. Before aging, the fresh AMOx catalyst has an average particle size in the range of 20-120 nm, preferably 45-95 nm.

In one or more embodiments, the AMOx catalyst is coated on a substrate with a dry gain from about 0.1 to about 1.5 $g/in^3$ (about 6-90 g/L), preferably 0.2 to about 1.0 $g/in^3$ (about 12-60 g/L) over the volume of the substrate.

One or more embodiments that include an AMOx catalyst and a second catalytic composition can be referred to as a "multi-component" AMOx catalyst.

In one or more embodiments, the AMOx catalyst can optionally be integrated with other functions such as Selective Catalyzed Reduction (SCR) catalyst, CO oxidation, hydrocarbon storage, hydrocarbon oxidation, NOx storage, NO oxidation, etc. as one catalyst or on one substrate via different layouts (zoning, layering, homogeneously blending, etc.).

In one or more specific embodiments, a catalyst system for treating an exhaust gas stream comprises the $AMO_x$ catalyst and a selective catalytic reduction (SCR) catalyst to promote reaction of the ammonia with nitrogen oxides to form nitrogen and $H_2O$ selectively, wherein the selective catalytic reduction (SCR) catalyst is located in a zone upstream of the AMOx catalyst; located in a layer above the AMOx catalyst; or the SCR catalyst is homogeneously blended with the AMOx catalyst; or any combination thereof.

Substrate

Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate").

In specific embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic.

Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter").

In specific embodiments, the catalyst substrate comprises a honeycomb substrate in the form of a wall-flow filter or a flow-through substrate, preferably a flow-through honeycomb substrate.

SCR Catalyst

In one or more embodiments, the SCR catalyst comprises a zeolitic or non-zeolitic molecular sieve and a prompter metal.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In one or more specific embodiments, the molecular sieve materials have a framework type selected from AEI, AFT, AFX, CHA, DDR, EAB, EMT, ERI, FAU, FER, GME, JSR, KFI, LEV, LTA, LTL, LTN, MFI, MOZ, MSO, MWW, OFF, PAU, RHO, SAS, SAT, SAV, SBS, SBT, SFW, SSF, SZR, TSC, UEI, WEN, and combinations thereof. In one preferred embodiment of the present invention, the molecular sieve materials have a framework type selected from the group consisting of CHA, AEI, AFX, ERI, KFI, LEV, AFT, EAB, DDR, PAU, RHO, SAV, SAT, TSC, UEI, LTA, MFI, FER, FAU and combinations thereof. In still further specific embodiments, the molecular sieve materials have a framework type selected from CHA, AEI, and AFX. In one or more very specific embodiments, the molecular sieve materials have the CHA framework type.

The ratio of silica to alumina of the molecular sieve material can vary over a wide range. In one or more specific embodiments, the molecular sieve materials have a silica to alumina molar ratio (SAR) in the range of 2 to 200, including 5 to 100, 8 to 50, and 10 to 30.

In one or more embodiments, the molecular sieve materials have a crystallite size from 0.01 microns to 10 microns, or a preferably a crystallite size from 0.1 microns to 5.0 microns.

The promoter metal content of the catalyst, calculated as the oxide, is, in one or more embodiments, at least about 0.1 wt. %, reported on a volatile-free basis. In specific embodiments, the promoter metal content, calculated as the oxide, is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis.

In specific embodiments, the promoter metal comprises Cu, and the Cu content, calculated as CuO is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis. In specific embodiments, the Cu content of the molecular sieve, calculated as CuO, is in the range of about 1 to about 10 wt. %.

In other specific embodiments, the promoter metal comprises Fe, and the Fe content, calculated as $Fe_2O_3$ is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis. In specific embodiments, the Fe content of the molecular sieve, calculated as $Fe_2O_3$, is in the range of about 1 to about 10 wt. %.

In other specific embodiments, the promoter metal is Cu, Fe, or combination thereof.

Layouts of AMOx Catalyst

In one or more embodiments, referring to FIG. 1A, the AMOx catalyst 1 is wash coated on a substrate 0 to form a layer.

In other embodiments, the AMOx catalyst 1 further comprises a SCR catalyst by homogeneous blending, wherein the SCR catalyst to AMOx catalyst weight ratio is 0.5-15, preferably 2-10, more preferably 3.5-7.5, to from an integrated catalyst system.

In specific embodiments, the AMOx catalyst 1 may extend from the outlet end 6 towards the inlet end 5 in the range of about 5% to about 100%, including 10%, 20%, 30%, 40%, 50%, 60%, 70%, 80%, 90% of the substrate length. In other specific embodiments, the AMOx catalyst may extend from the inlet end 5 towards the outlet end 6 in the range of about 5% to about 100%, including 10%, 20%, 30%, 40%, 50%, 60%, 70%, 80%, 90% of the substrate length.

In other embodiments, the AMOx catalyst is integrated with a SCR catalyst. Referring to FIG. 1B, the integrated catalyst system comprises a substrate 0 which is wash coated with AMOx catalyst 1 to form a first layer (or a bottom wash coat layer), and the SCR catalyst 2 is wash coated on top of the first layer to form a second layer (or top wash coat layer); the SCR catalyst to AMOx catalyst weight ratio is 0.5-15, preferably 2-10, more preferably 3.5-7.5.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

In other embodiments, the AMOx catalyst is integrated with SCR catalysts. Referring to FIG. 1C, the integrated catalyst system comprises a substrate 0 which is wash coated with AMOx catalyst 1 to form a first layer (or a bottom wash coat layer), and a first SCR catalyst 2 is coated upstream of a second SCR catalyst 3. Both SCR catalyst 2 and 3 are coated on top of the AMOx catalyst 1.

In specific other embodiments, the promoter metal of the first SCR catalyst 2 and the second SCR catalyst 3 are independently selected from Cu, Fe, or combination thereof.

It will be appreciated that the length of the first SCR catalyst 2 and the second SCR catalyst 3 can be varied. In one or more embodiments, the first SCR catalyst 2 and the second SCR catalyst 3 can be equal in length. In other embodiments, the first SCR catalyst 2 can be in the range of about 5% to 95%, including about 10%, about 15%, about 20%, about 25%, about 30%, about 35%, about 40%, about 45%, about 50%, about 55%, about 60%, about 65%, about 70%, about 75%, about 80%, about 85%, or about 90% of the length L of the substrate 0, with the second SCR catalyst

3 respectively covering the remainder of the length L of the substrate 0, without a gap 4. In other embodiments, the first SCR catalyst 2 can be about 10%, about 15%, about 20%, about 25%, about 30%, about 35%, about 40%, about 45%, about 50%, about 55%, about 60%, about 65%, about 70%, about 75%, about 80%, about 85%, or about 90% of the length L of the substrate 0, with the second SCR catalyst 3 respectively covering the remainder of the length L of the substrate 0, with a gap 4, as depicted in FIG. 1C.

Figure 2:
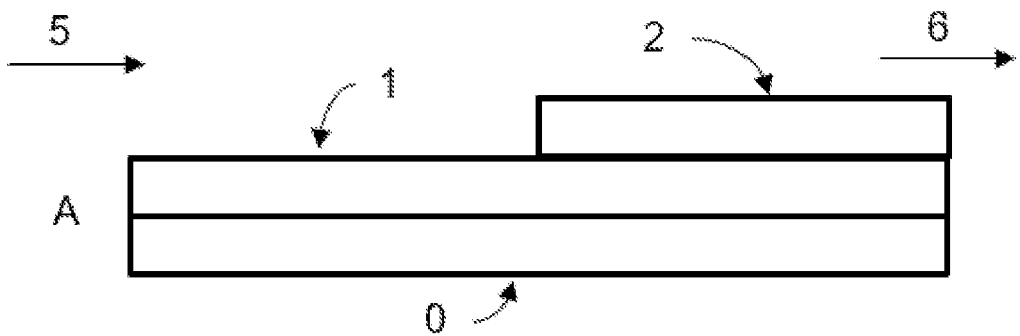
FIG. 2A shows a layout of integrated catalyst system according to one or more embodiments.
FIG. 2B shows a layout of integrated catalyst system according to one or more embodiments.
Figure 2:
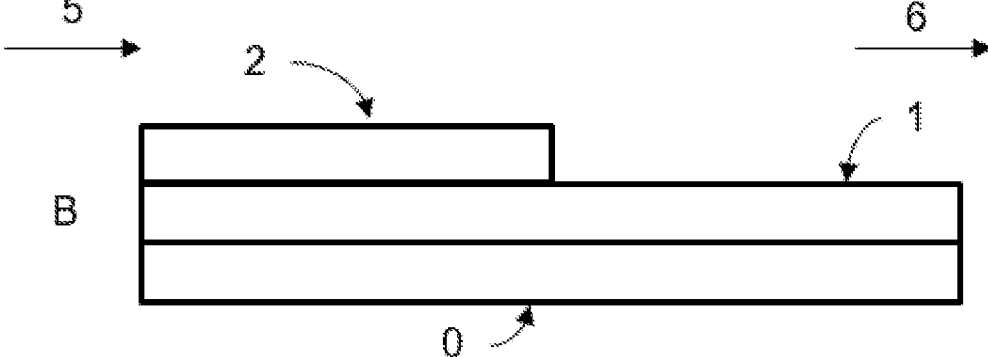

In other embodiments, the AMOx catalyst is integrated with a SCR catalyst. Referring to FIG. 2A, the integrated catalyst system comprises a substrate 0 which is wash coated with AMOx catalyst 1 to form a first layer (or a bottom wash coat layer), and the SCR catalyst 2 is wash coated on top of the first layer to form a second layer (or top wash coat layer).

In specific embodiments, the AMOx catalyst 1 extends in the range of about 100% of the substrate length. The SCR catalyst 2 may extend from the outlet end 6 towards the inlet end 5 in the range of about 5% to about 100%, including 10%, 20%, 30%, 40%, 50%, 60%, 70%, 80%, 90% of the substrate length.

In other embodiments, the AMOx catalyst is integrated with a SCR catalyst. Referring to FIG. 2B, the integrated catalyst system comprises a substrate 0 which is wash coated with AMOx catalyst 1 to form a first layer (or a bottom wash coat layer), and the SCR catalyst 2 is wash coated on top of the first layer to form a second layer (or top wash coat layer).

In specific embodiments, the AMOx catalyst 1 extends in the range of about 100% of the substrate length. The SCR catalyst 2 may extend from the inlet end 5 towards the outlet end 6 in the range of about 5% to about 100%, including 10%, 20%, 30%, 40%, 50%, 60%, 70%, 80%, 90% of the substrate length.

Figure 3:
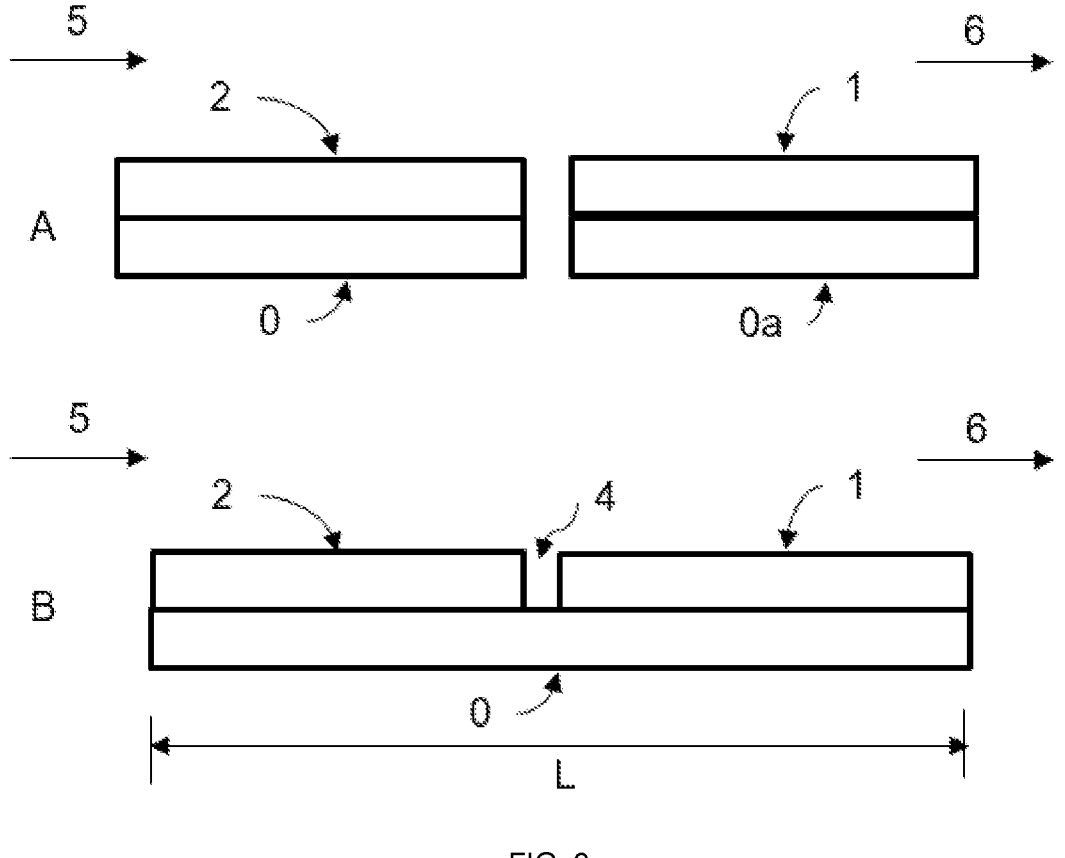
FIG. 3A shows a layout of integrated catalyst system according to one or more embodiments.
FIG. 3B shows a layout of integrated catalyst system according to one or more embodiments.

In other embodiments, the AMOx catalyst is integrated with a SCR catalyst. Referring to FIG. 3A, the integrated catalyst system comprises a substrate 0a which is wash coated with AMOx catalyst 1, and a substrate 0 which is wash coated with SCR catalyst 2. The substrate 0 is located upstream of the substrate 0a. It will be appreciated that the substrate 0 and substrate 0a could be identical or different.

In other embodiments, the AMOx catalyst is integrated with a SCR catalyst. Referring to FIG. 3B, the integrated catalyst system comprises a substrate 0 which is wash coated with a SCR catalyst 2 located upstream of an AMOx catalyst 1.

It will be appreciated that the length of the SCR catalyst 2 and the AMOx catalyst 1 can be varied. In one or more embodiments, the SCR catalyst 2 and the AMOx catalyst 1 can be equal in length. In other embodiments, the SCR catalyst 2 can be in the range of about 5% to 95%, including about 10%, about 15%, about 20%, about 25%, about 30%, about 35%, about 40%, about 45%, about 50%, about 55%, about 60%, about 65%, about 70%, about 75%, about 80%, about 85%, or about 90% of the length L of the substrate 0, with the AMOx catalyst 1 respectively covering the remainder of the length L of the substrate 0, without a gap 4. In other embodiments, the SCR catalyst 2 can be about 10%, about 15%, about 20%, about 25%, about 30%, about 35%, about 40%, about 45%, about 50%, about 55%, about 60%, about 65%, about 70%, about 75%, about 80%, about 85%, or about 90% of the length L of the substrate 0, with the AMOx catalyst 1 respectively covering the remainder of the length L of the substrate 0, with a gap 4, as depicted in FIG. 3B.

It will also be appreciated by one skilled in the art that the upstream zone and downstream zone can be at least partially overlapping. As used herein, the term "at least partially overlapping" means that the upstream zone and the downstream zone can overlap by an amount in the range of at least about 0.1% to at least about 99%.

Figure 4:
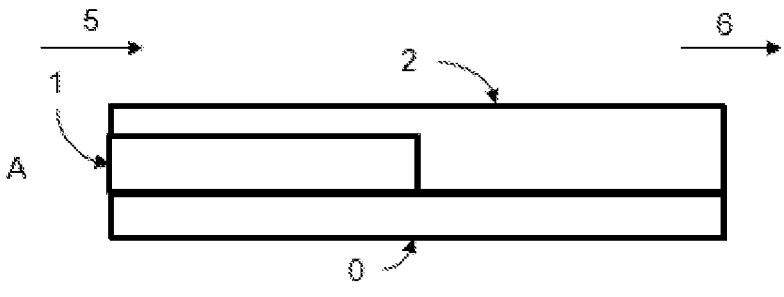
FIG. 4A shows a layout of integrated catalyst system according to one or more embodiments.
FIG. 4B shows a layout of integrated catalyst system according to one or more embodiments.
FIG. 4C shows a layout of integrated catalyst system according to one or more embodiments.
Figure 4:
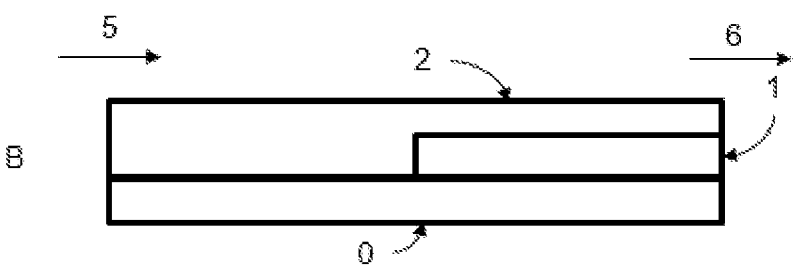
Figure 4:
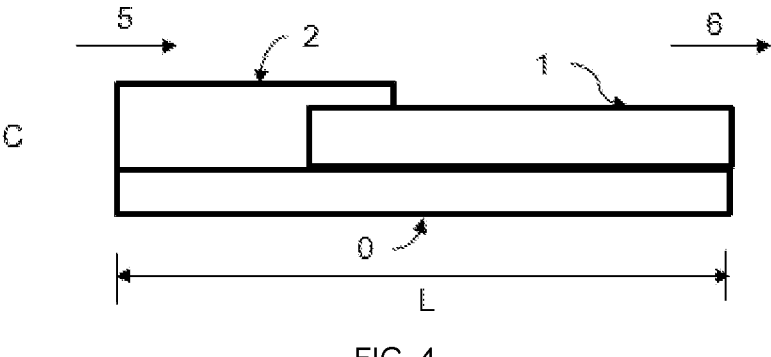

In one or more embodiments, the upstream zone and the downstream zone can be completely overlapping (e.g., about 100%). Referring to FIG. 4A, an exemplary embodiment of an integrated system is shown. The integrated catalyst system comprises a SCR catalyst 2 located upstream of an AMOx catalyst 1 on a substrate 0.

In specific embodiments, the SCR catalyst 2 extends in the range of about 100% of the substrate length. The AMOx catalyst 1 may extend from the inlet end towards the outlet end in the range of about 5% to about 100%, including 10%, 20%, 30%, 40%, 50%, 60%, 70%, 80%, 90% of the substrate length.

In other specific embodiments, the SCR catalyst 2 extends in the range of about 100% of the substrate length. Referring to FIG. 4B, the AMOx catalyst 1 may extend from the outlet end towards the inlet end in the range of about 5% to about 100%, including 10%, 20%, 30%, 40%, 50%, 60%, 70%, 80%, 90% of the substrate length.

In one or more embodiments, the upstream zone comprising the SCR catalyst is partially overlapping the downstream zone comprising the AMOx catalyst. Referring to FIG. 4C, an exemplary embodiment of an integrated system is shown. An upstream SCR catalyst 2 extends from the inlet end 5 of the substrate 0 through less than the entire length L of the substrate 0 and partially overlapping a downstream AMOx catalyst 1. The AMOx catalyst 1 extends from the outlet end 6 of the substrate 0 through less than the entire length L of the substrate.

EXAMPLES

The present invention is now further illustrated by reference to the following examples, however, the examples are used for the purpose of explanation and not intended to limit the scopes of the invention.

Example 1

Preparation of AMOx Slurry

The AMOx coating slurry was made via incipient-wetness impregnation method. Firstly, 250 g of $TiO_2$ support (purity >98% in anatase phase) was placed in a container, and then 6 g platinum ammine solution was added dropwise under constant agitation to ensure an even distribution. The resulting impreganted powder was thereafter diluted with de-ioned $H_2O$ to make a slurry with solid content of 42 wt. %. Afterwards, the mixture was milled to obtain a particle size of $D_{90}$=6–9 μm.

Preparation of SCR Slurry

The SCR slurry was made with a mixture of Cu-CHA, zirconium acetate binder and $H_2O$. 21 g zircornia acetate binder (solid content=30.0 wt. %) was added dropwise to 160 g de-ioned water under stirring. After it was well-mixed, 120 g Cu-CHA powder was added slowly into the mixture under rigorous stirring (~400 rpm), and the ratio of Cu-CHA to $ZrO_2$ was around 19:1 based on the dry weight of each material. The solid content was less than 42%.

Preparation of the Integrated Catalyst System

The ceramic monolithic core (1"×3", 400/4) was used in the coating process by submerging it in the AMOx or SCR slurry. Referring to FIG. 1B, it was first coated with the AMOx slurry. After excess slurry was removed using compressed air, the wet samples were dried briefly in flowing air at 250° C. Subsequently, the cores were calcined in a muffle furnace for one hour at 450° C. (ramp 4° C./min), then cooled to 250° C. and weighed to determine the AMOx catalyst loading. The dry gain of the AMOx layer is 0.5 g/in³ (30 g/L). After the AMOx layer is completed, the SCR layer is applied using the same process as that for preparing the AMOx layer, but with a SCR layer dry gain of 1.79 g/in³ (110 g/L).

It will be obvious to one skilled in the art, that optimization of the integrated catalyst design from FIG. 1B, can be used for design of the front or rear of catalysts depicted in 1C, 2A, 2B, 3A, 3B, 4A, 4B or 4C.

Examples 2-3 and Comparative Examples 1-6

Catalysts of Examples 2-3 and Comparative examples 1-6 are prepared as example 1, except that the supports used in the AMOx slurry are different, as shown in Table 1.

TABLE 1

| Formulations of each integrated catalyst system | | | |
|---|---|---|---|
| | AMOx catalyst | | |
| Example No. | Platinum ammine solution | Support | SCR catalyst |
| Example 1 | 6 g | 250 g $TiO_2$ | 120 g Cu-CHA; |
| Example 2 | 6 g | 250 g $SiO_2$—$TiO_2$ (5% $SiO_2$, 95% $TiO_2$,) | 21 g Zicornia Acetate (solid content: |
| Example 3 | 6 g | 250 g $SiO_2$—$TiO_2$ (8% $SiO_2$, 92% $TiO_2$,) | 30 wt. %) CuO loading: |
| Example 4 | 6 g | 250 g $SiO_2$—$TiO_2$ (10% $SiO_2$, 90% $TiO_2$,) | 3.25 wt. %; Ratio of |
| Comparative Example 1 | 6 g | 250 g $SiO_2$—$Al_2O_3$ (98.5% $Al_2O_3$, 1.5% $SiO_2$) | $SiO_2$/$Al_2O_3$ of CHA: 27.2 |
| Comparative Example 2 | 6 g | 250 g H—Y | |
| Comparative Example 3 | 6 g | 250 g H-CHA | |
| Comparative Example 4 | 6 g | 250 g H-ZSM-5 | |
| Comparative Example 5 | 6 g | 250 g $CeO_2$ | |

The resulted integrated catalyst systems have the compositions as shown in Table 2.

TABLE 2

| Compositions of each integrated catalyst system | | | |
|---|---|---|---|
| | AMOx Catalyst | | |
| Example No. | PGM | Support | SCR Catalyst |
| Example 1 | 2 g/ft³ Pt | 0.5 g/in³ $TiO_2$ | 1.79 g/in³ Cu-CHA |
| Example 2 | 2 g/ft³ Pt | 0.5 g/in³ $SiO_2$—$TiO_2$ (5% $SiO_2$, 95% $TiO_2$) | 1.79 g/in³ Cu-CHA |
| Example 3 | 2 g/ft³ Pt | 0.5 g/in³ $SiO_2$—$TiO_2$ (8% $SiO_2$, 92% $TiO_2$) | 1.79 g/in³ Cu-CHA |
| Example 4 | 2 g/ft³ Pt | 0.5 g/in³ $SiO_2$—$TiO_2$ (10% $SiO_2$, 90% $TiO_2$) | 1.79 g/in³ Cu-CHA |
| Comparative Example 1 | 2 g/ft³ Pt | 0.5 g/in³ $Al_2O_3$—$SiO_2$ (98.5% $Al_2O_3$, 1.5% $SiO_2$) | 1.79 g/in³ Cu-CHA |
| Comparative Example 2 | 2 g/ft³ Pt | 0.5 g/in³ Y zeolite | 1.79 g/in³ Cu-CHA |
| Comparative | 2 g/ft³ Pt | 0.5 g/in³ CHA zeolite | 1.79 g/inn³ Cu-CHA |

TABLE 2-continued

| | Compositions of each integrated catalyst system | | |
|---|---|---|---|
| | AMOx Catalyst | | |
| Example No. | PGM | Support | SCR Catalyst |
| Example 3 | | | |
| Comparative Example 4 | 2 g/ft³ Pt | 0.5 g/in³ ZSM-5 zeolite | 1.79 g/in³ Cu-CHA |
| Comparative Example 5 | 2 g/ft³ Pt | 0.5 g/in³ CeO₂ | 1.79 g/in³ Cu-CHA |

Testing Method for NH$_3$ Oxidation

All the catalytic tests were carried out on a flow reactor using simulated diesel exhaust with 1"×3" monolith cores. 1000 ppm NH$_3$ was added together with other components of exhaust gas including 10% O$_2$, 8% CO$_2$, 7% H$_2$O, balanced with N$_2$, at a space velocity of 150000 h$^{-1}$. This NH$_3$ oxidation experiment was carried out in the range of 175-400° C. at the temperature ramp rate of 20° C./min. The NH$_3$ conversion was calculated as ([NH$_3$]$_{in}$—[NH$_3$]$_{out}$)/[NH$_3$]$_{in}$×100%; T$_{70}$, is defined as the temperature at which the catalyst converts 70% of NH$_3$; lower T$_{70}$, means a more active catalyst for NH$_3$ oxidation.

Figure 5:
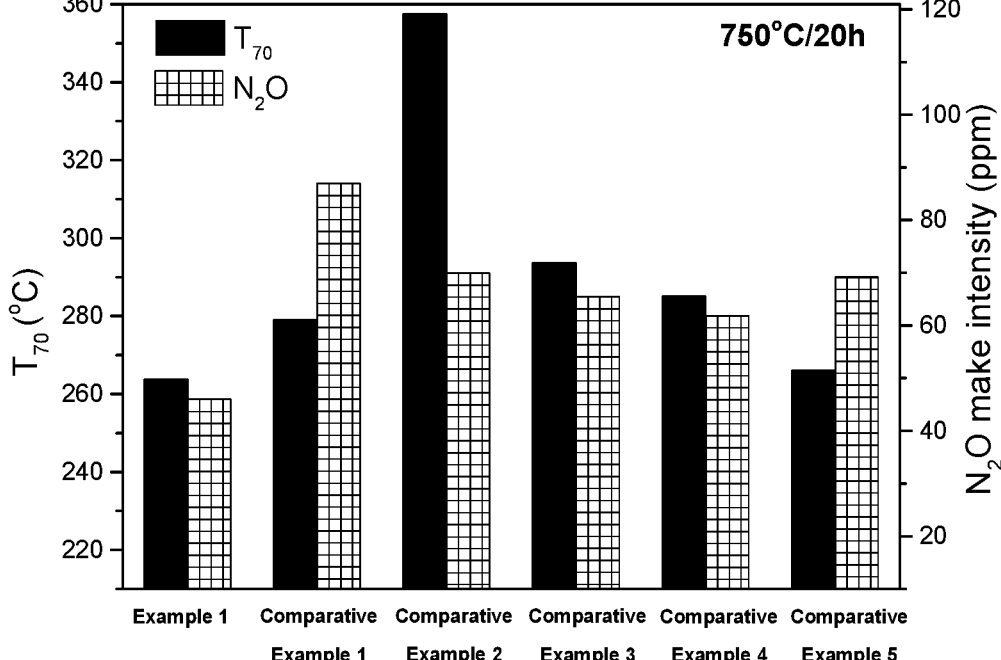
FIG. 5 shows the catalytic performance ($NH_3$ conversion and $N_2O$ formation) of sample from example 1 and samples from comaparative examples after hydrotheral aging.

FIG. 5 shows the catalytic performance (NH$_3$ conversion and N$_2$O formation) of sample from example 1 and samples from comaprative examples after hydrothermal aging at 750° C. for 20 h. It shows that the sample of the present invention (example 1) using Pt/TiO$_2$ has lower T$_{70}$ and less N$_2$O formation than those from the comparative examples, that is, the sample of the present invention has superior activity but with less N$_2$O formation than the comparative samples. Without being bound by any specific theory, the improved activity may be due to a synergic effect between Pt and TiO$_2$.

Figure 6:
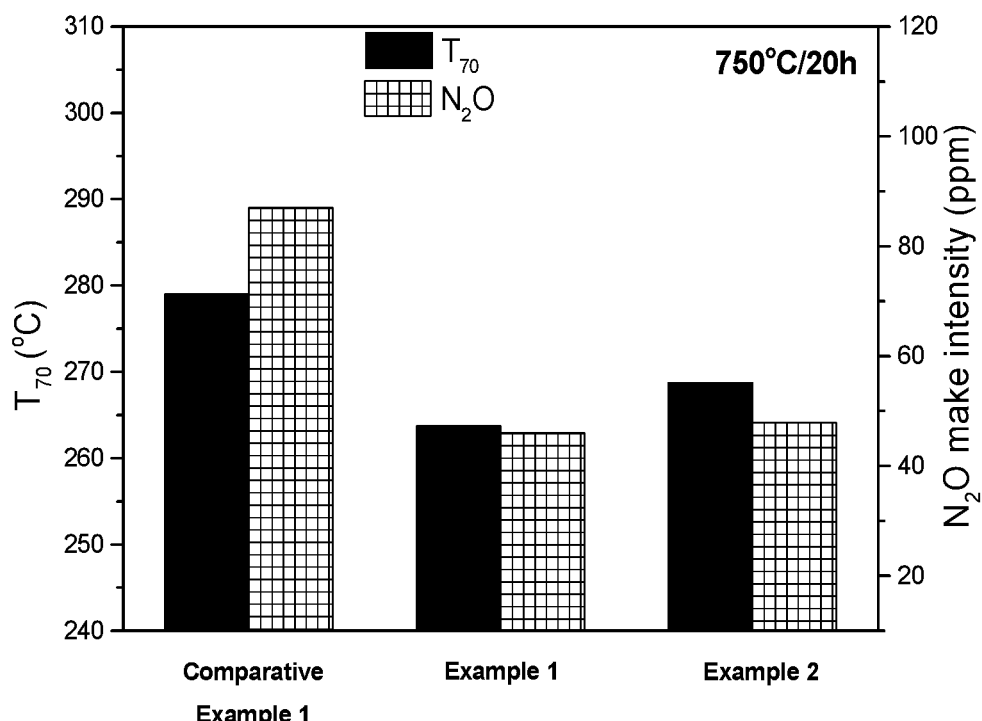
FIG. 6 shows the fresh and aged catalytic performance ($NH_3$ conversion and $N_2O$ formation) of sample from example 1, example 2 and samples from comaparative examples.
Figure 6:
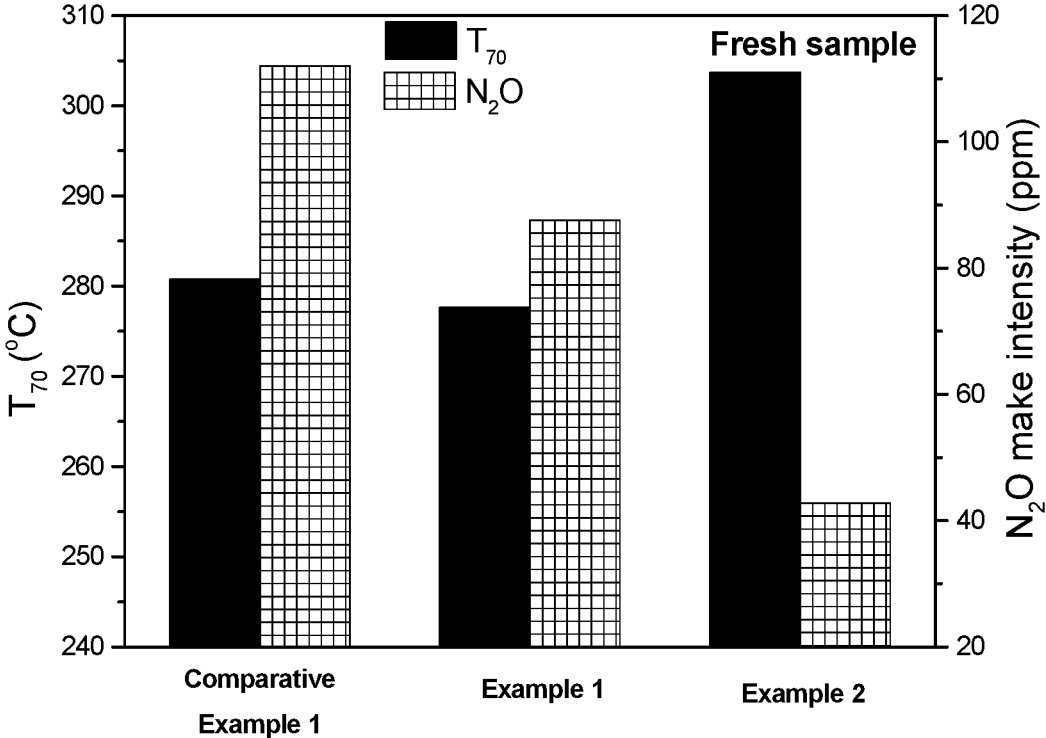

FIG. 6 shows the fresh (left) and aged (right, 750° C./20 h) catalytic performance (NH$_3$ conversion and N$_2$O formation) of sample from example 1 and samples from comaprative examples.

It shows that the sample of the present invention (example 1) using Pt/TiO$_2$ has improved catalytic performance after aging than the fresh catalysts, that is, the sample of the present invention has a lower T$_{70}$ and less N$_2$O formation simultaneously after aging than the fresh catalyst. Again without being bound by any specific theory, the improvement with aging may be due to more formation of Pt$^0$ which is believed to be the active site for NH$_3$ oxidation. In addition, the changing properties of the support (TiO$_2$) during aging may facilite the desorption of reaction intermediate and thus result in less N$_2$O formation.

The Properties of the TiO$_2$ Used in Example 1

Figure 7:
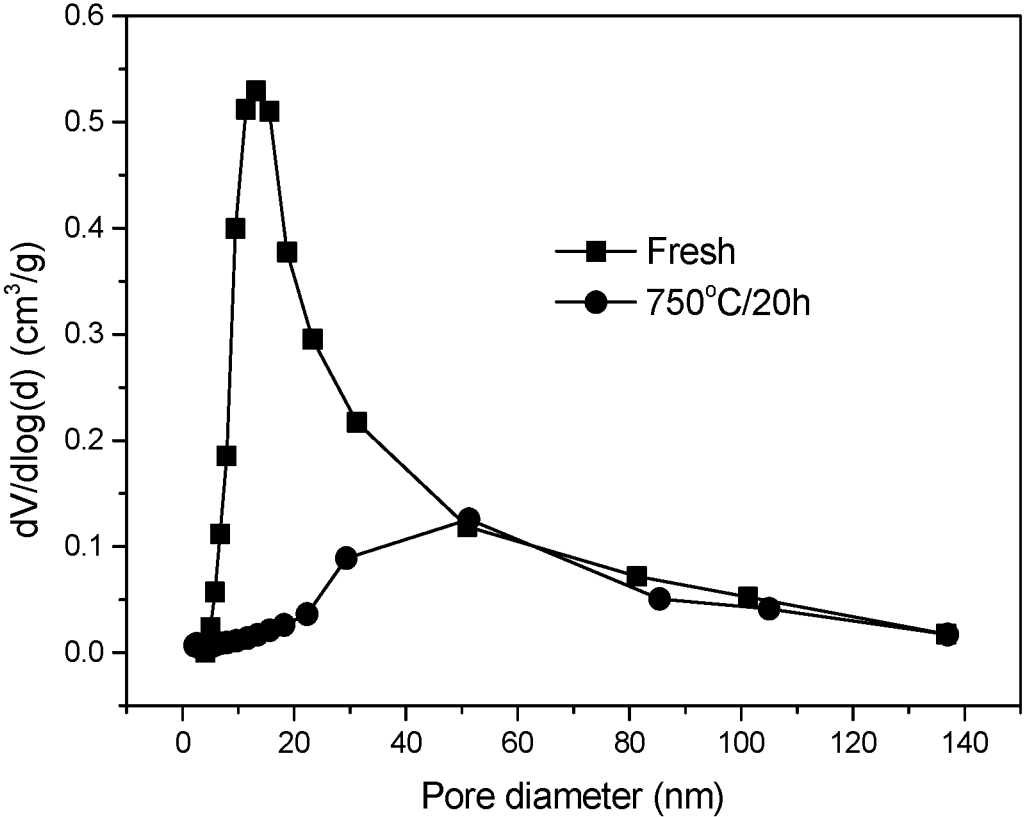
FIG. 7 shows the pore volume and pore diameter of $TiO_2$.
Figure 8:
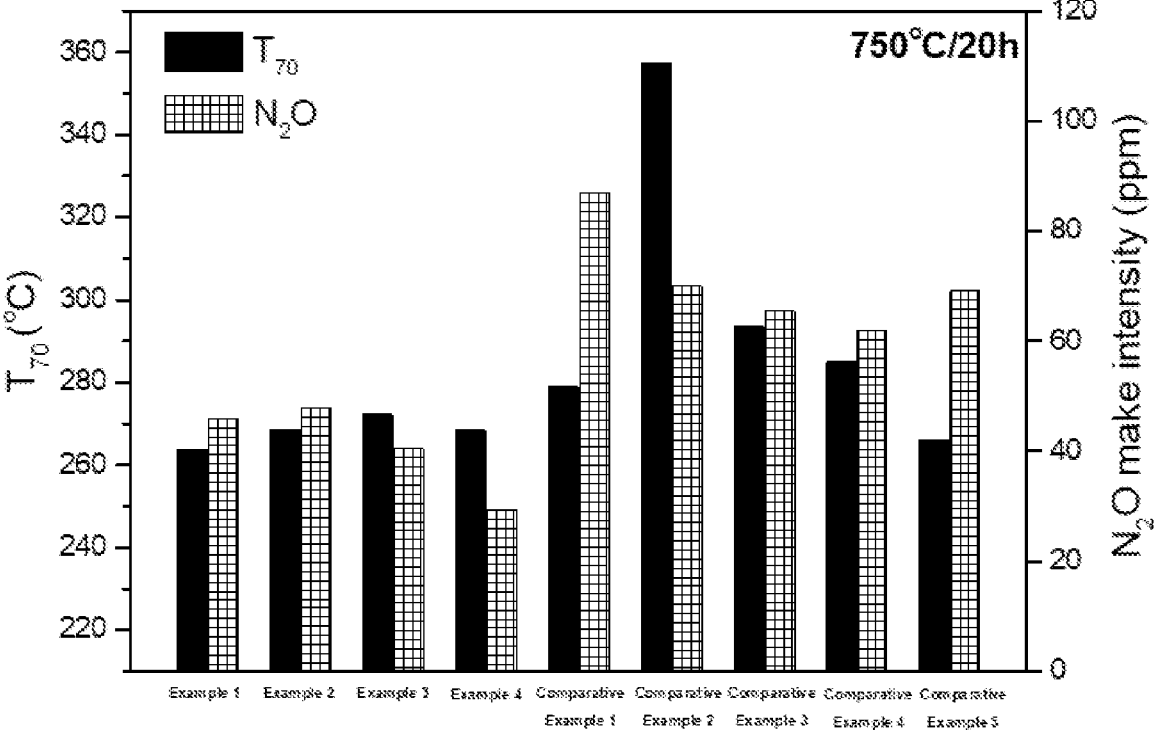
FIG. 8 shows the catalytic performance ($NH_3$ conversion and $N_2O$ formation) of sample from examples and samples from comaparative examples after hydrotheral aging.

The BET surface area, pore volume and pore diameter of the TiO$_2$ were tested with Micrometrics triStar II. The TiO$_2$ sample was slowly heated to 473 K and held at this temperature for 24 hours under vacuum (~50 mTorr). Then the sample was transferred to the adsorption unit and the N$_2$ adsorption was measured at liquid N$_2$ temperature. FIG. 7 shows the pore volume and pore diameter of aged and fresh TiO$_2$.

TABLE 3

| | | The BET surface area of aged and fresh TiO₂. | | |
|---|---|---|---|
| Sample | BET surface area (m²/g) | Mean Pore Volume (cc/g) | Mean Pore Diameter (nm) |
| Fresh TiO₂ | 82.78 | 0.29 | 14.0 |
| 750° C./20 h aged TiO₂ | 17.03 | 0.08 | 24.1 |

It will be apparent to those skilled in the art that various modifications and variations can be made in the present invention without departing from the scope or spirit of the present invention. Thus, it is intended that the present invention cover such modifications and variations as come within the scope of the appended claims and their equivalents.

The invention claimed is:

1. A selective ammonia oxidation (AMOx) catalyst, comprising:
   a platinum group metal and a support consisting of TiO$_2$, wherein the TiO$_2$ is doped with from 0 wt. % to 10 wt. % of SiO$_2$, ZrO$_2$, Y$_2$O$_3$, La$_2$O$_3$, or a mixture thereof, and wherein the TiO$_2$ has a BET specific surface area ranging from 9 m$^2$/g to 25 m$^2$/g after 10% vol H$_2$O hydrothermal aging at 750° C. for 20 hours.

2. The AMOx catalyst according to claim 1, wherein the TiO$_2$ has a mean pore volume ranging from 0.01 cm$^3$/g to 0.2 cm$^3$/g after aging at 750° C. for 20 hours; or a mean pore diameter in the range of 2 nm to 50 nm after aging at 750° C. for 20 hours.

3. The AMOx catalyst according to claim 1, wherein a loading of the platinum group metal ranges from about 0.3 g/ft$^3$ to about 20 g/ft$^3$, calculated as a total weight of platinum group metal over a volume of the substrate.

4. The AMOx catalyst according to claim 1, wherein the platinum group metal is Pt.

5. The AMOx catalyst according to claim 1, wherein the AMOx catalyst is coated on a substrate in a loading amount ranging from 0.1 g/in$^3$ to g/in$^3$, calculated as a total weight of AMOx catalyst over a volume of the substrate.

6. An integrated catalyst system, comprising the AMOx catalyst according claim 1; and a selective catalytic reduction (SCR) catalyst, wherein the SCR catalyst is located in a zone upstream of the AMOx catalyst; located in a layer above the AMOx catalyst; homogeneously blended with the AMOx catalyst; or any combination thereof.

7. The integrated catalyst system according to claim 6, wherein the SCR catalyst comprises a prompter metal on a molecular sieve material.

8. The integrated catalyst system according to claim 7, wherein the molecular sieve material is chosen from framework types of CHA, AEI, AFX, ERI, KFI, LEV, AFT, EAB, DDR, PAU, RHO, SAV, SAT, TSC, UEI, LTA, MFI, FER, FAU and combinations thereof.

9. The integrated catalyst system according to claim 8, wherein the molecular sieve material is a CHA framework type; and wherein the crystallite size of the CHA ranges from about 0.1 microns to about 5 microns.

10. The integrated catalyst system according to claim 7, wherein the molecular sieve material has a silica to alumina ratio ranging from 2 to 200.

11. The integrated catalyst system according to claim 7, wherein the promoter metal is Cu, Fe, or combination thereof, and the promoter metal content of the SCR catalyst ranges from 0.1 wt. % to 10 wt. %, calculated as the oxide.

12. The integrated catalyst system according to claim 7, wherein the AMOx catalyst and SCR catalyst are integrated as one catalyst or on one substrate.

13. The integrated catalyst system according to claim 7, wherein the substrate is a flow-through monolith or a wall-flow filter.

14. An exhaust treatment system comprising:

a diesel oxidation catalyst (DOC), a catalyzed soot filter (CSF), a reductant injector, and the integrated catalyst system of claim 6;

optionally, the exhaust treatment system further comprises a second selective catalyzed reduction (SCR) catalyst and/or a lean NOx trap (LNT).

* * * * *